Sept. 25, 1923.
B. E. BRIERTON ET AL
1,468,797
OPTOMETRICAL METHOD AND INSTRUMENT
Filed April 20, 1921
6 Sheets-Sheet 1

Inventors
Benjamin E. Brierton
James H. Tinder,
By
Attorney

Sept. 25, 1923.

B. E. BRIERTON ET AL 1,468,797

OPTOMETRICAL METHOD AND INSTRUMENT

Filed April 20, 1921  6 Sheets-Sheet 2

Inventors
Benjamin E. Brierton and
James H. Tinder,

By

Attorney

Sept. 25, 1923.

B. E. BRIERTON ET AL

1,468,797

OPTOMETRICAL METHOD AND INSTRUMENT

Filed April 20, 1921   6 Sheets-Sheet 3

Inventors
Benjamin E. Brierton and
James H. Tinder,

By

Attorney

Sept. 25, 1923.

B. E. BRIERTON ET AL

1,468,797

OPTOMETRICAL METHOD AND INSTRUMENT

Filed April 20, 1921     6 Sheets-Sheet 4

Inventors
Benjamin E. Brierton and
James H. Tinder,
By
Attorney

Sept. 25, 1923.  B. E. BRIERTON ET AL  1,468,797
OPTOMETRICAL METHOD AND INSTRUMENT
Filed April 20, 1921   6 Sheets-Sheet 6

Patented Sept. 25, 1923.

1,468,797

UNITED STATES PATENT OFFICE.

BENJAMIN E. BRIERTON AND JAMES H. TINDER, OF BIRMINGHAM, ALABAMA.

OPTOMETRICAL METHOD AND INSTRUMENT.

Application filed April 20, 1921. Serial No. 462,822.

*To all whom it may concern:*

Be it known that we, Drs. BENJAMIN E. BRIERTON and JAMES H. TINDER, citizens of the United States, residing at Birmingham, in the county of Jefferson and State of Alabama, have invented new and useful Improvements in Optometrical Methods and Instruments, of which the following is a specification.

The present invention relates to improvements in the art of examining and testing the human eyes to determine the presence, nature and extent of optical defects thereof which require correction, and the primary object of the invention is to provide an improved method and a novel and improved instrument of this character, whereby the radii of curvature of the cornea of the eye, on all meridians thereof, and including the pupillary area thereof, may be easily, quickly and accurately measured, for the purpose of determining its refractive state or condition, so that all errors of refraction, due to anomalous refractive curvature of the cornea of the eye may be corrected by the fitting of eyeglasses having suitable lenses. The improved method and instrument provided for carrying out the same in accordance with the present invention, possesses the important advantages over methods heretofore employed, including the method employed in the use of the so-called "ophthalmometers," that they enable the attendant to detect and measure errors of refraction due to anomalous refractive curvature of the polar or pupillary area of the cornea, which area is the most important refractive portion of the eye used in direct vision, as distinguished from the method heretofore employed in the use of the so-called ophthalmometers which are incapable of testing or measuring the refractive power of the polar or pupillary area of the cornea, their tests or measurements being confined to the peripheral area of the cornea, and it being left to supposition that the polar or pupillary area of the cornea has the same refractive characteristics as those of the peripheral area. It sometimes occurs, however, that the peripheral area of the cornea may be astigmatic in its curvature, due, for example, to cicatrization following removal of a foreign body or an operation, while the pupillary area of the cornea may be normal or perfect in its curvature, and vice versa, and so, while determinations made by the use of an ophthalmometer are likely to be erroneous, due to a false supposition on which they are based, the method and instrument provided by the present invention enable the attendant to actually test and measure the curvature of the cornea, not only with respect to its peripheral portion, but with respect to its most important or pupillary area, and such tests and measurements may be made with facility on all meridians of the cornea.

Another object of the invention is to provide a novel and improved iconoscope which forms part of the instrument, and which embodies a short-focus optical system capable of presenting greatly magnified images from the eye to the observer, the optical system being so constituted that these images will be erect and unperverted, thus enabling the user of the instrument to survey the area of the cornea without confusion, as any distortion that may be present will appear to the observer looking through the iconoscope in the same relation to the pole of the cornea as such images would appear if such images were viewed directly by the observer's eye, and the iconoscope embodies an objective lens which is adjustable to vary its magnifying power and its field, thus enabling the polar area and also the peripheral area of the cornea to be surveyed. The iconoscope also embodies prisms which constitute image-doubling elements, these prisms being adjustable to vary the image-doubling effect thereof, without, however, altering the distance of the luminous objects or mire-boxes from the eye under observation, and these prisms are also rotatable in unison with the luminous objects or mire boxes when the latter are turned to measure and determine the curvature of the cornea on its different meridians, and hence the relationship between the prisms and the luminous objects or mire boxes remains constant.

Further objects of the invention are to provide the relatively adjustable elements of the instrument with scales which will directly indicate the refractive measurements determined by the instrument, the meridians on which such measurements are made and the degree of separation of the mire boxes, to provide an improved construction and arrangement of the mire boxes or luminous objects and the adjustment therefor, and to otherwise provide a generally improved instrument of this class, to the ends that the necessary tests and measurements may be made with facility and with scientific accuracy.

In the accompanying drawings:—

The invention is carried out by the aid of an instrument of suitable construction, it being preferable to employ an instrument substantially like that shown in the drawing.

Figures 1, 2:
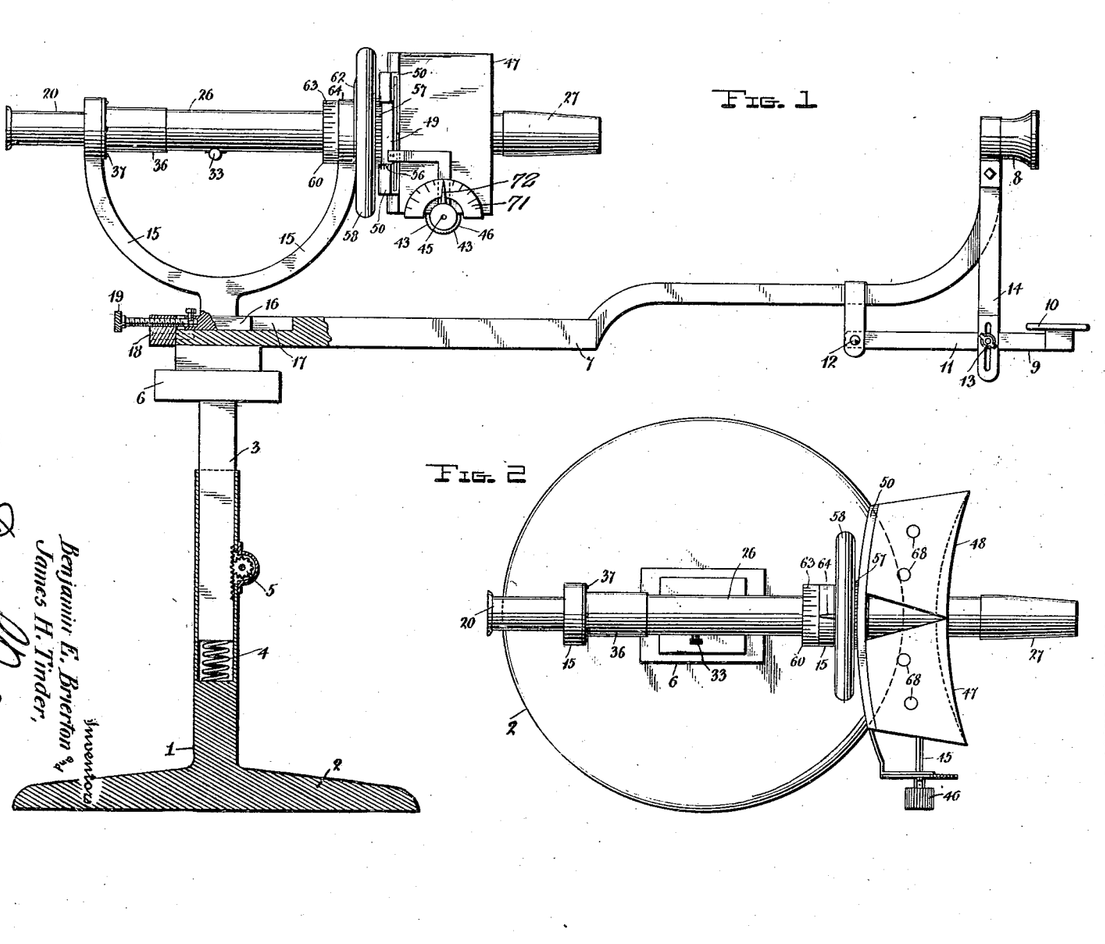
Figure 1 is a side elevation, partly in section, of an instrument constructed in accordance with the present invention.
Figure 2 is a top plan view of an iconoscope forming part of the instrument shown in Figure 1.

The instrument, as shown, is provided with a support which consists preferably of a stand 1 having a broad base 2, the columns of the stand being tubular to receive telescopically a post 3. This post supports the instrument and it is adjustable vertically in the tubular column of the stand to enable the opthalmostat and the apex of the iconoscope to be brought to the proper elevation. A compression spring 4 may be advantageously placed in the tubular column of the stand, so that the bottom of the vertically movable post 3 will rest thereon, the spring substantially balancing the weight of the instrument, and a rack and pinion adjustment 5 is preferably provided between the stand and the pillar or post 3 for adjusting the elevation of the instrument. The top of the post 3 has a head 6 fixed thereon and this head has an arm 7 rigidly secured to it, the outer end of this arm being bent or curved upwardly and provided at its extremity with an ophthalmostat 8, against which the eye to be examined is placed. A geniostat 9 is also carried by the arm 7, it comprising a rest 10 for the chin of the patient, and a lever 11 which is pivoted at 12 to the arm 7 and provided with a thumb-screw or other suitable adjustment 13 on the downward extension 14, whereby the geniostat may be positioned at the proper elevation to insure correct centering of the patient's eye in the ophthalmostat.

Figures 6, 7, 8:
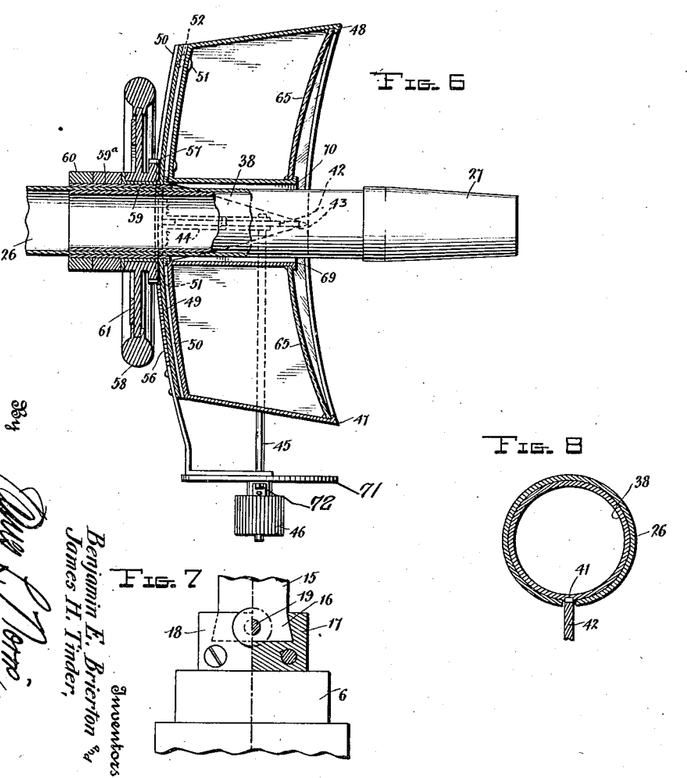
Figure 6 represents a section on the line 6—6 of Figure 4.
Figure 7 is a view partly in elevation and partly in section, showing the connection and adjustment between the iconoscope bracket and the base or stand on which it rests.
Figure 8 represents on an enlarged scale a section on the line 8—8 of Figure 3.
Figure 9:
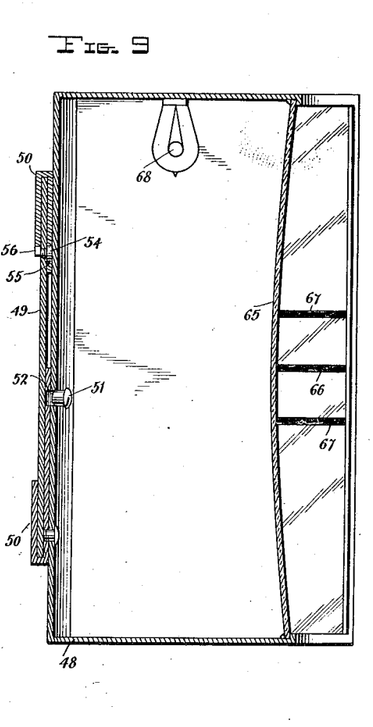
Figure 9 represents, on an enlarged scale, a section on the line 9—9 of Figure 4.

The iconoscope which is located above the arm 7 is supported preferably by a bracket 15. In order that the iconoscope may be adjusted in a direction toward and from the ophthalmostat for the purpose of placing the optical system of the iconoscope at the proper focal distance from the pole of the cornea of the patient's eye positioned in the ophthalmostat, the base 16 of the bracket is fitted to slide or otherwise shift longitudinally of the arm 7, the base 16 being shown in the present instance as dove-tailed to fit and slide longitudinally in a correspondingly formed groove 17 in the top of the arm 7. Suitable means is provided for adjusting the base 16 in the slot 17 and for holding the base in different adjusted positions. Preferably and as shown, a block 18 is fixed to the end of the arm 7, it extending across the end of the groove 17, and an adjusting screw 19 is threaded in the block and has an operative connection with the base 16.

Figure 3:
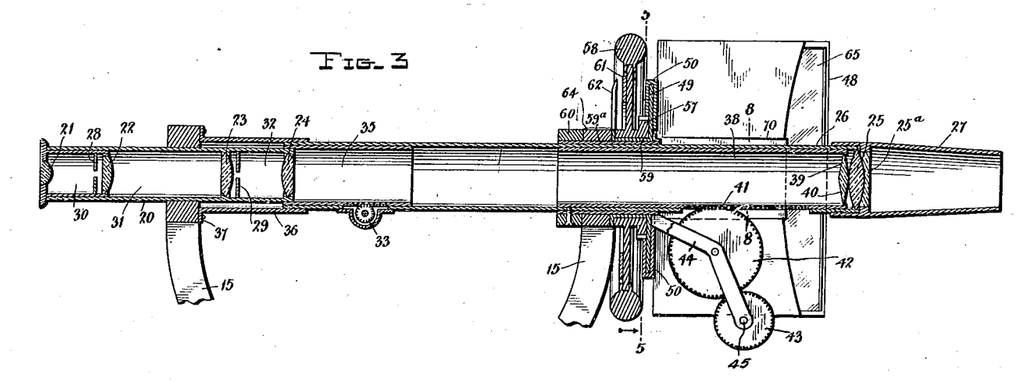
Figure 3 represents a longitudinal section on an enlarged scale of the iconoscope and the cooperative ophthalmostat.

The iconoscope, according to the present invention, comprises a lens tube 20 which contains positive lenses 21 and 22 which comprise the first or eye-piece set of the ocular system, the positive lenses 23 and 24 which comprise the second set of the ocular system, and an achromatic objective lens comprising preferably a plus crown-glass lens 25 which is fitted in the forward end of a second lens tube 26, and a minus flint-glass lens 25$^a$ which is fitted in a hood 27, the latter having a threaded or other suitable form of connection with the forward end of the lens tube 26 whereby it may be adjusted axially thereof and thus vary the distance between the elements 25 and 25$^a$ of the achromatic lens, the purpose of which will hereinafter appear. A stop or diaphragm 28 is interposed between the lenses 21 and 22 and a similar stop or diaphragm 29 is interposed between the lenses 23 and 24. Chambers 30, 31 and 32 are the vacuum chambers of the ocular system. The lens tube 20, which contains the lenses composing the eye-piece elements of the ocular system, is adjustable axially relatively to the supporting bracket 15, a rack and pinion adjustment 33 being preferably provided, the pinion being supported by the tube 26 and cooperating with a rack on the sleeve 35, the latter being connected to the forward end of the lens tube 20 and slidable longitudinally within the tube 26. The rear end of the tube 26 is steadied or supported by a sleeve or collar 36 which fits around its rear end and is fixed as at 37 to the rear arm or fork of the bracket 15. The hood 27 which is preferably of funnel or contracted form, is provided for the purpose of admitting the effective rays only to the objective lens of the iconoscope.

The iconoscope provided by the present invention comprises the short-focus optical system, above described, in combination with prisms, or equivalent means, for doubling the images reflected from the cornea of the eye under examination and as viewed by the observer, and, furthermore, the doubling power of these prisms can be varied at will by the observer. Moreover, the optical system of the iconoscope is such that it enables the observer to view greatly magnified images as reflected from the eye under examination, without inversion or perversion of these images. Preferably and as shown, the tube 26 contains a prisms tube 38, this prisms tube being slidable longitudinally or axially in the tube 26 and carrying at its forward end a pair of prisms 39 and 40, these prisms being reversely arranged in the tube 38 and operative to double the images from the respective halves of the cornea of the eye under examination. Preferably and as shown, the prisms tube 38 is adjustable by a rack 41 which is fixed to said tube and cooperates with gears 42 and 43, these gears being mounted on a bracket 44 and the gear 43 being fixed to an adjusting shaft 45 which is provided at its outer end with a milled head, or other suitable manipulating portion 46.

The mire boxes 47 and 48, which provide the luminous objects for the respective sides or halves of the eye under examination, are located at opposite sides of the axis of the iconoscope but are capable of being relatively adjusted so as to bring the inner or proximate edges of these mire boxes into touch, as well as to permit separation thereof. In the present instance, these mire boxes are supported and guided to move relatively in a direction toward and from one another, by the track 49, the boxes being attached to carriers 50 mounted to slide on the track 49 and held in cooperative relation therewith by suitable means, such for example, as by shouldered screws 51, the box 47 being guided by the screws 51 which extend through slots in the back of the box, thence through slots 52 formed in the box-carriers 50, and these screws 51 are tapped or otherwise fixed in the supporting and guiding track 49. Similarly, screws 54 may be provided which extend through slots in the back of the mire box 48 and through slots 55 in the mire box-carriers 50, these screws being tapped or otherwise secured in the track 49. By this construction, the mire boxes are so supported by the screws 51 and 54 that the boxes may be adjusted toward and from one another and they will be held to the mire box-carriers 53, and also the latter will be held in proper relation with the track 49. Means is provided for simultaneously adjusting the mire boxes in a direction toward and from one another and equidistantly from the optical center of the iconoscope. Preferably and as shown, the mire box-carriers are provided with racks 56 which engage opposite sides of an adjusting gear 57, this gear being fixed on and forming part of the hub of an adjusting member 58 which is preferably in the form of a hand-wheel. Obviously, rotation of the hand-wheel and, in consequence, the gear 57, will cause the mire boxes to shift simultaneously in a direction toward or from one another and to equal extents with respect to the optical axis of the iconoscope, the hand-wheel 58 and gear 57 being mounted concentrically of the iconoscope. In the present instance, the hand-wheel 58 is mounted to revolve on a sleeve 59 to which the track 49 is fixed, the sleeve 59 surrounding a sleeve 59$^a$, the latter being rotatably mounted on the tube 26 of the iconoscope, this sleeve 59$^a$ having a collar 60 fixed thereon and arranged to abut against the bearing formed in the upper end of the forward bracket 15. The hand-wheel 58 is provided with a suitably graduated scale 61 to cooperate with a pointer 62 attached to the sleeve 59, whereby the distance between the mire boxes will be indicated. The collar 60 is also provided with a suitably graduated scale 63 to cooperate with a pointer 64 which is fixed on top of the forward end of the bracket 15, whereby the angular position of rotation of the mire boxes about the axis of the iconoscope will be indicated. By mounting the mire boxes in the manner described, it will be understood that these mire boxes are not only adjustable in a direction toward or from one another, but that they are bodily rotatable about the optical axis of the iconoscope as a center, independently of the adjustments of the relative distance between the boxes. The milled head 46 may be utilized as a handle in the operations of rotating the mire boxes about the axis of the iconoscope. The sleeve 59 to which the mire box-supporting track 49 is fixed, and on which the hand-wheel 58 is independently rotatable, is fixed on the tube 26 of the iconoscope, so that when the mire boxes are rotated into different positions about the axis of the iconoscope as a center, the optical system of the iconoscope, including the prisms, will maintain a constant or unaltered relation with the mire boxes.

Figure 4:
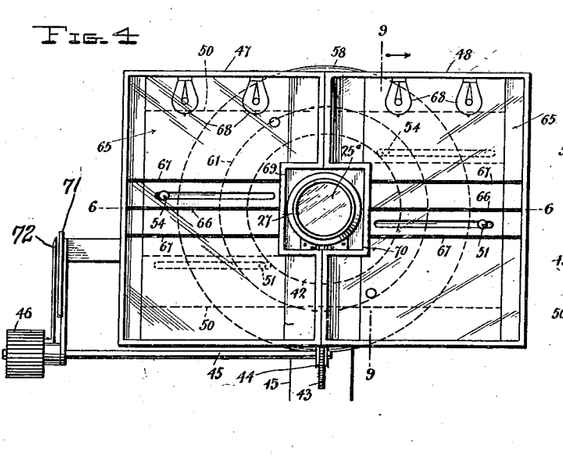
Figure 4 is an elevation of the radiant boxes, as viewed from the side thereof which faces the ophthalmostat.
Figure 5:
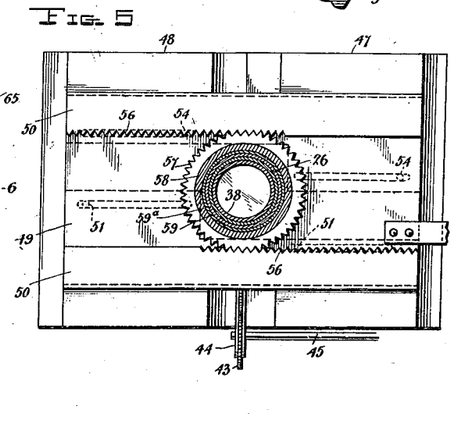
Figure 5 represents a section on the line 5—5 of Figure 3, looking in the direction of the arrows.

The front of each mire box is covered with a panel 65 composed of opal or ground glass, or other appropriate translucent material, the face of each panel having a spherical surface which is concentric with the center of curvature of the cornea of the human eye. For example, taking the radius of curvature of the cornea at 7.8 mm., every point on the surface of the panel of each mire box would be 11½ inches from the corresponding radial point on the cornea. The panels of the mire boxes also bear on their spherical surfaces objects which are preferably in the form of opaque lines, each object shown in the present instance comprising a principal axis-defining line 66 and a pair of parallel equally-spaced lines 67 at opposite sides thereof. The lines constituting the object on one panel are in alinement with the corresponding lines constituting the object on the other panel and, moreover, the lines on both panels have the same characteristic relatively to the cornea of the eye, as is possessed by the surfaces of the panels; that is to say, every point on any one of these lines is the same distance from the corresponding radial point on the surface of the cornea. This characteristic insures the production of images in miniature which are exact facsimiles of the objects on the mire boxes, these images undergoing no distortion when reflected from the surface of the cornea, assuming that the surface of the cornea is normal or perfect, following the fundamental law of optics that every angle of reflection is equal to its corresponding angle of incidence. It is to be understood that the track 49 which supports the mire boxes is curved concentrically with the curvature of the surfaces of the panels of the mire boxes, in order that the concentric relationship between the surfaces of the panels of the mire boxes and the cornea of the eye in the ophthalmostat will be maintained, irrespective of the relative distance between the mire boxes. The objects borne by the panels of the mire boxes may be rendered luminous by electric lamps 68, or other suitable illuminating means.

It is to be understood that the luminous or mire boxes are located at opposite sides of the optical axis of the iconoscope and they are capable of being brought into touch; that is to say, they may be moved toward one another until their proximate edges abut. To enable this to be accomplished, the inner or proximate sides of the luminous or mire boxes are recessed, as at 69 and 70, so that these recesses, which are complemental to one another, will accommodate the tube 26 of the iconoscope between the luminous or mire boxes when the latter are brought into touch.

Figure 15:
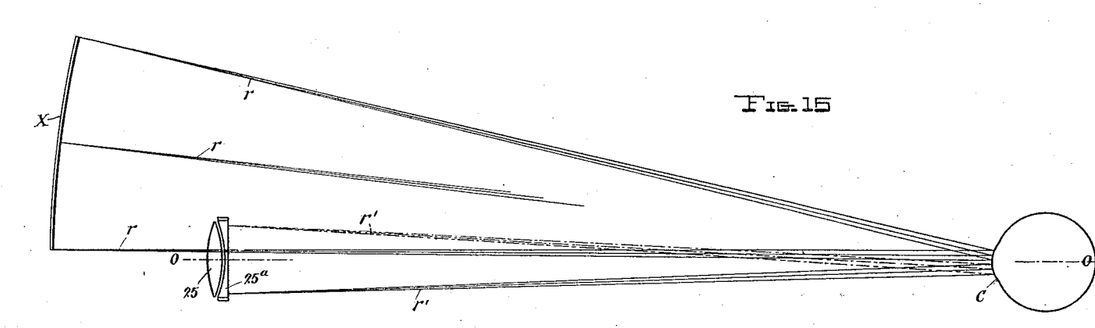
Figures 15 and 16 are diagrammatic views showing the directions of the light rays from the mire boxes to the objective lens of the iconoscope, when the mire boxes are "in touch" to survey the polar or pupillary area and separated to survey the peripheral area, respectively, of the cornea.
Figure 16:
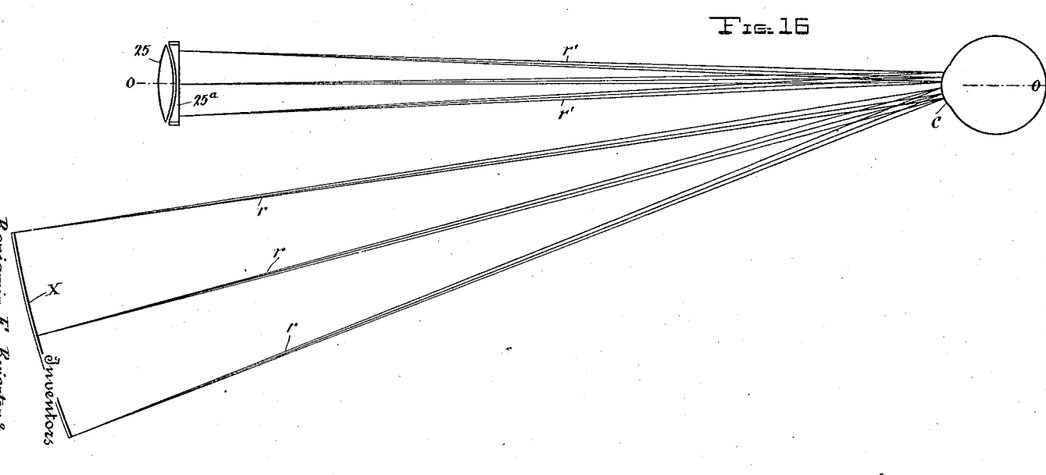
Figure 17:
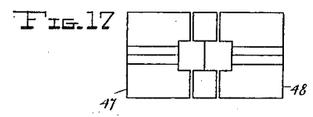
Figures 17 to 24 inclusive represent graphically the images as they appear to the attendant in testing and measuring corneal surfaces having different optical characteristics.
Figure 18:
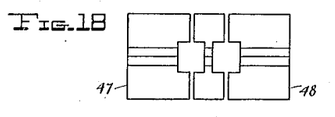

The optical system of the instrument functions as follows:—Figures 15 and 16 each show the course of the light rays from one of the mire boxes to the cornea of the eye and thence into the iconoscope, the mire box as represented in Figure 15 being in its proximate position, while the mire box as represented in Figure 16 is in its separated position. In each instance the luminous object provided by the mire box face is designated X, r represents the incident light rays from the luminous object, C represents the cornea of the eye under examination and r′ represents the reflected light rays from the cornea, and 25 and 25$^a$ the lenses which in the present instance comprise the objective of the iconoscope. The rays r′ are reflected from the surface of the cornea at an angle which is equal to the angle of incidence of the rays r, although the reflected rays emanate from an image which is produced behind the front surface of the cornea which acts as a reflector, and this law of optics applies when the mire boxes are "in touch", in accordance with Figure 15 or are separated in accordance with Figure 16, although the angle of the reflected rays relatively to the optical axis O—O of the iconoscope will be altered, as will be clear from a comparison of Figures 15 and 16.

Figure 12:
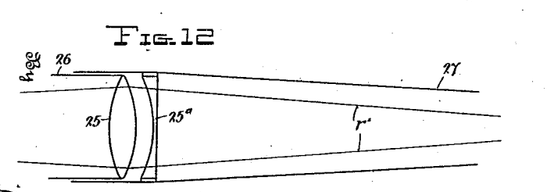
Figures 12, 13 and 14 are diagrammatic views illustrating the manner in which the power of the objective lens and the image-doubling prisms of the iconoscope are varied.
Figure 13:
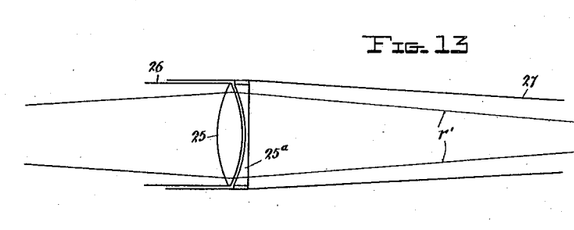

The rays r′ reflected from the cornea into the iconoscope pass through the objective thereof substantially as shown in Figures 12 and 13, the objective system as shown being composed of the plus or positive crown-glass lens 25 and the minus flint-glass lens 25$^a$, the two combined producing a short focus achromatic lens system, the dioptral power or focal length of which may be increased or decreased and also the field of view thereof diminished or increased, depending on the area of the corneal surface to be surveyed, by adjusting the lens 25$^a$ axially relatively to the lens 25. By this construction, when the lenses 25 and 25$^a$ are separated to the maximum extent, say about 10 mm., as shown in Figure 12, the minus lens 25$^a$ will produce the minimum amount of neutralization of the plus lens 25 and the objective system will then have the maximum dioptral power and its field will be at the minimum. The objective system is preferably so adjusted at the commencement of the examination of the cornea, as it will then enable the pupillary area of the cornea, which is the most useful portion of the cornea used in vision, to be examined and its optical power or curvature measured with accuracy. Then, in order to determine whether the remainder of the corneal surface deviates in its curvature from that of the pupillary area, the field of examination and measurement is extended or enlarged by bringing the minus lens 25ᵃ closer to the plus lens 25, as shown in Figure 13, this having the effect of reducing the power of the objective system and widening its field to include the peripheral, as well as the pupillary, areas of the cornea.

Figure 10:
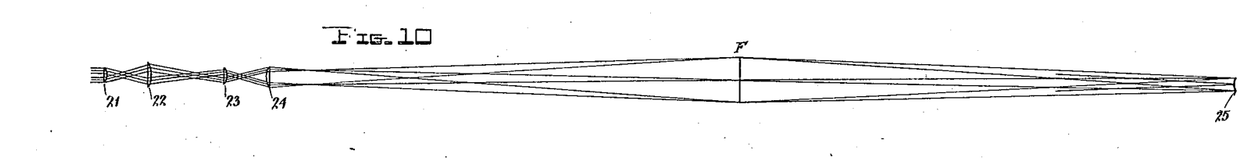
Figure 10 is a diagrammatic view showing the course of the light rays in passing through the optical system of the instrument.
Figure 11:
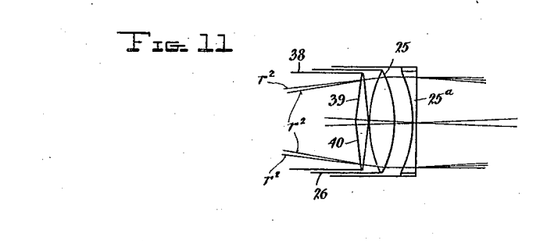
Figure 11 is a diagrammatic view showing the course of the light rays from the cornea through the objective lens and image-doubling element of the iconoscope.
Figure 14:
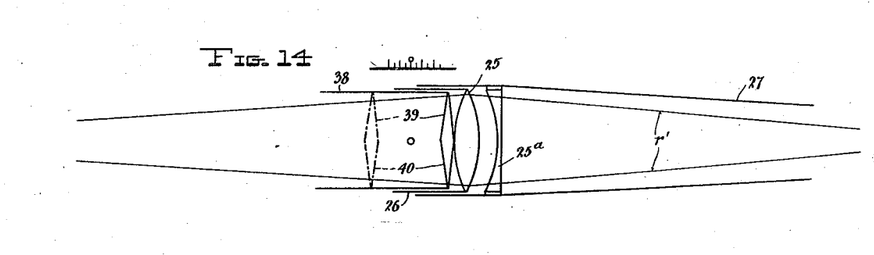

These reflected rays $r'$ after passing through the achromatic objective system, pass through the image-doubling prisms 39, as shown substantially in Figures 11 and 14. The doubling power of this prism system is regulated by adjusting the prisms toward and from the objective lens system, and this prism system functions to double each light ray or cone of light rays from the posterior surface of the plus lens 25 of the objective system so that as these rays proceed to the focal distance of the objective system, a pair of double images of the corneal-images is formed. That is due to the fact that the prism system divides the objective lens system into two foci-forming centers, Figure 11 illustrating how each ray from the prism system is split into two rays $r^2$ which diverge as they proceed from the prism system. The double images formed at the focal distance F of the objective (Figure 10) are inverted, and these double inverted images becoming the objects project divergent rays therefrom which are received by the first lens 24 of the ocular system comprising the eyepiece, and as these rays pass through the lenses 23, 22 and 21 of the eyepiece, they are brought into parallelism, as shown diagrammatically in Figure 10, and these parallel rays fall upon the cornea of the eye of the observer or attendant, the latter perceives erect or uninverted, unperverted, magnified and double images of the corneal images from the eye under examination.

The image-doubling prism system is employed for the purpose of locating the axis of the principal meridians of the cornea, and also this prism system operating in conjunction with the adjustments of the mire boxes from proximate to separated relation enables the radii of curvature of the corneal surface on these meridians, when the same have been located, to be measured in diopters. It will be understood, however, that the prism system may be employed independently of the adjustment of the mire boxes, and vice versa, as well as one of the elements in conjunction with the other.

The adjustment of the prism system to vary the distance between it and the achromatic objective system, as will be understood from Figures 11 and 14, varies the image doubling power of the prism system.

The instrument hereinbefore described is operated in substantially the following manner in testing the cornea of the human eye to detect errors of refraction due to anomalous refractive curvature and for measuring the amounts of such errors: The eye of the patient is placed in the ophthalmostat 8 and the geniostat or chin rest is adjusted so that the eye under examination will be centered in the ophthalmostat and maintained in such position during the examination. The operator who may be seated at the opposite end of the instrument, places his eye to the eye-lens 21 and, if necessary, manipulates the screw 19 to bring the ocular system of the iconoscope into proper focal relation with the pole or center of the cornea of the eye positioned in the ophthalmostat. Also the rack-and pinion 33 is manipulated to focus the optical system comprising the tube 20 and the lenses 21, 22, 23 and 24 relatively to the cornea of the eye positioned in the ophthalmostat, it being understood that this adjustment of the iconoscope is effected without altering the distance between the faces of the mire boxes and the surface of the cornea of the eye positioned in the ophthalmostat. The lamps within the mire boxes being illuminated, the objects on the translucent panels of these boxes will produce images which will be reflected by the surface of the cornea of the eye under examination, back into the iconoscope, substantially as is shown in Figure 15 or 16, and will be visible to the observer as double magnified images substantially as represented in any one of Figures 17 to 23 inclusive, assuming that at the commencement of the examination, the mire boxes are arranged horizontally.

Owing to the fact that, when the mire boxes are at the proper distance from the eye under examination, every point on such faces is equi-distant from a corresponding point on the cornea of the eye positioned in the ophthalmostat, it follows, in obedience to the law of optics that the angle of reflection is equal to the angle of incidence, that each light ray emanating from the luminous face of each mire box will travel an equal distance to reach its corresponding point on the cornea of the eye, in consequence of which images of the mire box faces will be reflected from the cornea which will be free from metamorphopsia or distortion. These reflected images, while they are of miniature size when reflected from the cornea, appear as greatly enlarged images in the eye of the observer, due to the short-focus optical system of the iconoscope. Moreover, these images visible to the observer, are erect or un-inverted and they are un-perverted, so that the relation of the images to the pole or center of the cornea, as they appear to the observer, corresponds to the actual position of these images as they would appear in the cornea if observed directly by the eye of the observer.

The prism system 39 comprising part of the optical system of the iconoscope, constitutes a constant image-doubling element, and its adjustment in a direction axially of the ocular system of the iconoscope is for the purpose of determining the curvature of the corneal surface on its different meridians by finding the amount of prism power required to completely double the images as they are seen through the iconoscope, it being understood that the mire box system employed will produce corneal images which are perfectly "at touch" independently of the prisms.

Figure 19:
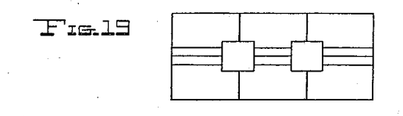
Figure 20:
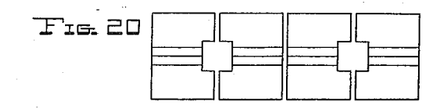
Figure 21:
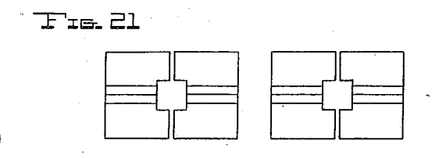

Commencing the examination with the mire boxes "at touch" and set horizontally and with the prism system set at zero, the double images observed by the attendant will be like those shown in Figure 19 if the cornea under examination is emmetropic or normal. If the curvature is myopic and the mire boxes are separated slightly, the observed images will appear like that represented in Figure 17 or Figure 18, depending on the degree of departure from normal, whereas if the curvature is hypermetropic or hyperopic and the mire boxes are separated slightly the observed images will appear like that represented in Figure 20 or Figure 21, depending on the degree of departure from normal. In any one of these cases, the curvature of the corneal surface under examination may be measured and determined, in diopters, by adjusting the prism system 39 from its zero or neutral position, in the proper direction until the double images under observation appear like those shown in Figure 19, when the mire boxes are in touch the adjustment of the prism system being effected by turning the knurled knob 46, and the amount of prism power required to correct the anomalous refractive curavture will be indicated, in diopters, on the scale 72.

Figure 22:
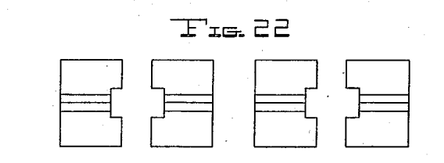

Figure 22 shows how the double images would appear to the observer when the increased doubling power of the prism system is used and the radiant boxes are separated to a substantial extent, the intermediate space in this image being produced by the increased doubling power of the prism system and the lateral spaces by the separation of the mire boxes.

Figure 23:
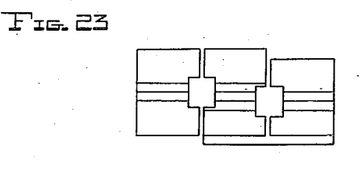
Figure 24:
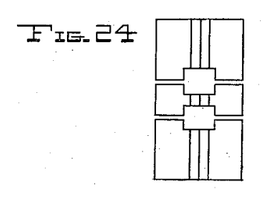

Should the images observed by the attendant appear like those shown in Figure 23, it would indicate astigmatism in the corneal surface under examination. The mire box system together with the iconoscope would then be revolved, while the images remain under observation, until the lines of the double images and their components are in exact alinement, and having located such meridian, the axis of which will be indicated by the scale and pointer 63 and 64, the amount of ametropia of the eye due to anomalous curvature of the cornea thereof is measured, after which the mire box system and iconoscope will be rotated to a position at right angles to its former position, thus bringing the images into the meridian corresponding to the secondary axis, when the images will appear substantially like those shown in Figure 24, wherein the longitudinal lines of the images and their components are in alinement but the central portion of the figure is shortened. The amount of this shortening will be measured by adjusting the prism system and the mire box system and indicated preferably directly in diopters and fractions thereof, by the respective scales of the instrument. Any difference observed in the size of the images on the different meridians of the eye under examination will indicate the presence of astigmatism, whereas, if no difference is observed in the size of the images on the different meridians, it indicates the absence of astigmatism.

In examining the cornea of the eye to detect anomalous refractive curvature, and especially astigmatism, the mire boxes are shifted relatively in a direction toward and from one another, from a position where they are in touch, that is, their proximate edges are in contact, to their separated relation, or vice versa, by rotation of the handwheel 58, the scale and cooperative pointer 61 and 62 indicating the amount of separation of the mire boxes, and hence, indicating the distance of the areas under examination from the pole or center of the cornea, on any given meridian. Any anomalous refractive curvature that may exist on any meridian of the corneal surface will manifest itself in the relationship of the double images from either or both mire boxes, and by adjusting the prism system by turning the knurled head or knob 46 until double images of the mire boxes are visible to the observer, the amount of the anomalous refractive curvature of the cornea will be determined, and this will be indicated by the scale and pointer 71 and 72. The same operation of relatively adjusting the mire boxes while the images thereof as reflected by the cornea are under observation, and, if necessary, adjusting of the prism system to produce complete double images from the respective mire boxes, is repeated on the various meridians of the eye under examination, the mire boxes and the iconoscope being rotatable bodily or as a unit about the optical axis of the iconoscope, the milled head or knob 46 being conveniently utilized as a handle for this latter operation, and the scale and pointer 63 and 64 indicating the angle of rotation, and hence the meridian of the cornea undergoing examination. In this way, any anomalous refractive curvature that may exist on any meridian of the cornea will be detected, and the prism power required for its correction may be accurately measured.

By constructing the mire boxes as hereinbefore described, it is possible, with an instrument embodying the present invention, to examine and measure not only the peripheral area of the corneal surface, but also the pupillary area thereof, and hence, the examination and determinations are scientifically correct and accurate as they are based on the actual measurements of the refractive characteristics of the most important part of the corneal surface, as distinguished from determinations based upon supposition.

The facility of the examination and the accuracy of the measurements of the corneal surface are aided by using the three parallel opaque lines on the translucent faces of the mire boxes, these lines preferably extending from the outer or remote border or edge of these faces to the opaque borders of the semi-squares 69 and 70, as these lines and the cooperative borders, forming the opaque line system, enable the exact axes of maximum and minimum curvatures to be located, by reason of the projection of these lines directly across the polar area of the cornea, and, furthermore, these lines will detect any torsion that may exist on any meridian of the corneal surface, the central line serving to locate the axis of the meridian of the corneal surface extending directly across the pole of the cornea, and the parallel secondary lines at opposite sides thereof will show the presence or prove the absence of breaks in the continuity of the curvature or distortion of the curved surface, due to cicatrization or other causes. The location, measurement of the diopters or refracting power, and the indication of the axes of the meridians of maximum and minimum curvatures are registered by the appropriate scales and pointers of the instrument, thus rendering certain the location of the meridian of astigmatism and indicating the axis and the power of the cylinder correction required where astigmatism is present.

We claim as our invention:—

1. The herein described method of examining the cornea of the eye for determining the refractive state of each of the annular areas thereof and for locating the axes of the two principal meridians of greatest and least refraction respectively, which comprises reflecting a pair of contiguous images of a pair of contiguous objects having their proximate edges in touch from a given diameter of the pupillary area of the cornea under examination and causing said images to appear to the observer as a double pair of such contiguous images, varying the image doubling effect while said double pairs of images are under observation to measure the refractive state of the central zone of the pupillary area, then successively separating said objects to progressively increasing extents to cause their images to be reflected successively from the annular areas lying between the central zone of the pupillary area and the periphery of the cornea and causing said images as reflected successively from the annular areas outside of the central zone of the pupillary area to appear to the observer as two pairs of images which are separated to different extents, and concurrently varying the image doubling effect to measure the refractive state of each successive annular area outside of the central zone, and repeating said operations and measurements on other diameters of the cornea under examination.

2. An optical instrument of the character described comprising an ophthalmostat, an iconoscope cooperative therewith and embodying movable prisms, and mire boxes having complemental recesses in their proximate edges to accommodate the iconoscope, said mire boxes being located at opposite sides of the iconoscope and adjustable to bring their proximate edges into touch and to separate them, the prisms of the iconoscope being adjustable to conform with any of the different positions of adjustment of the mire boxes.

3. An optical instrument of the character described, comprising an ophthalmostat, an iconoscope cooperative therewith, mire boxes having recesses in their proximate edges to accommodate the iconoscope, said mire boxes being located on opposite sides of the iconoscope, and means for adjusting the mire boxes to bring them into different positions equidistantly from the axis of the iconoscope whereby the proximate edges of the mire boxes may be brought into touch to cause contiguous images to be reflected from the central zone of the pupillary area of the cornea under examination and the mire boxes may also be brought into different relatively separated positions to reflect their images on the areas of the cornea outside of the central zone of the pupillary area and maintain the mire boxes equidistantly from the axis of the iconoscope.

4. An optical instrument of the character described comprising an iconoscope, and a pair of mire boxes located at opposite sides thereof and relatively movable in a direction toward and from one another, the proximate edges of said boxes having complemental recesses to accommodate the iconoscope between them when said boxes are brought into touch.

5. An optical instrument of the character described comprising an iconoscope, and a pair of mire boxes located at opposite sides of its axis, the proximate edges of said boxes having complemental recesses to accommodate the iconoscope between them when said boxes are brought into touch, and the boxes having translucent faces bearing opaque objects and cooperative opaque borders adjacent to said recesses.

6. An optical instrument of the character described comprising an iconoscope and a pair of cooperative mire boxes having operative faces of concentric spherical curvature.

7. An optical instrument of the character described comprising an iconoscope and a pair of cooperative mire boxes located at opposite sides thereof and having operative faces of concentric spherical curvature, and means to guide said boxes for relative movement in a direction toward and from one another while maintaining the concentricity of their spherical operative faces.

8. An optical instrument of the character described comprising an iconoscope adapted to be focussed on the cornea of an eye, and a pair of cooperative mire boxes bearing objects all points of which are equi-distant from the same center at which the center of curvature of the portion of the cornea of the eye is to be located.

In testimony whereof we have hereunto set our hands in presence of two subscribing witnesses.

BENJAMIN E. BRIERTON.
JAMES H. TINDER.

Witnesses:
CARRIE RATTON,
CARL STANFORD.